Nov. 5, 1963   J. O. TRIMBLE   3,109,209
MOLD-SUPPORTING MEANS AND PROCESS FOR MAKING SAME
Filed Feb. 8, 1961   3 Sheets-Sheet 1

INVENTOR.
John O. Trimble
BY
John B. Dowell
ATTORNEY

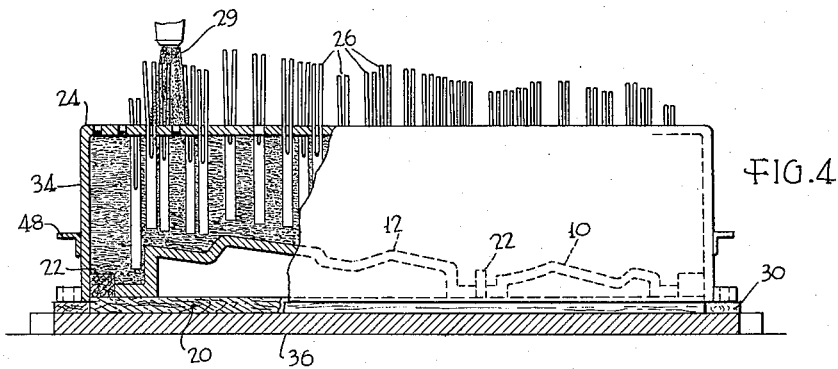
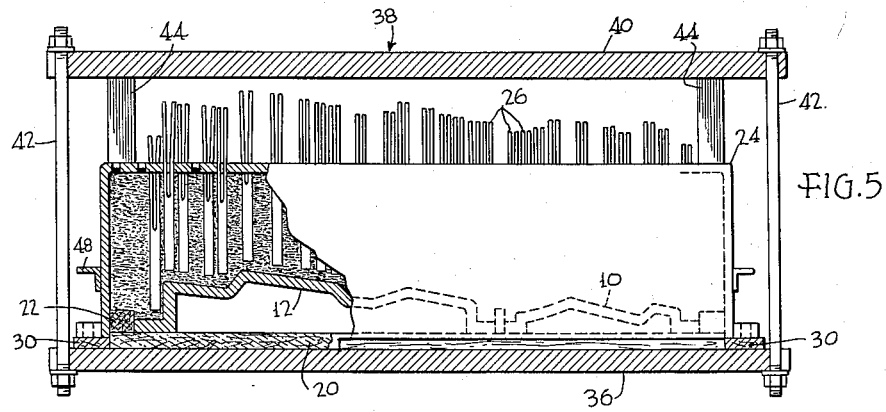
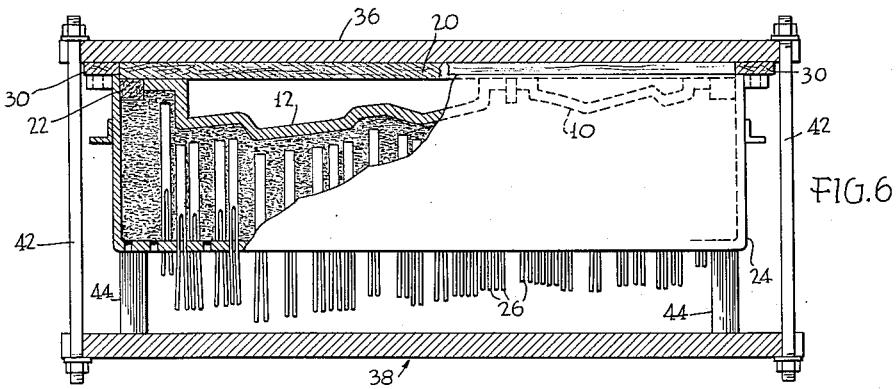

Nov. 5, 1963   J. O. TRIMBLE   3,109,209
MOLD-SUPPORTING MEANS AND PROCESS FOR MAKING SAME
Filed Feb. 8, 1961   3 Sheets-Sheet 3
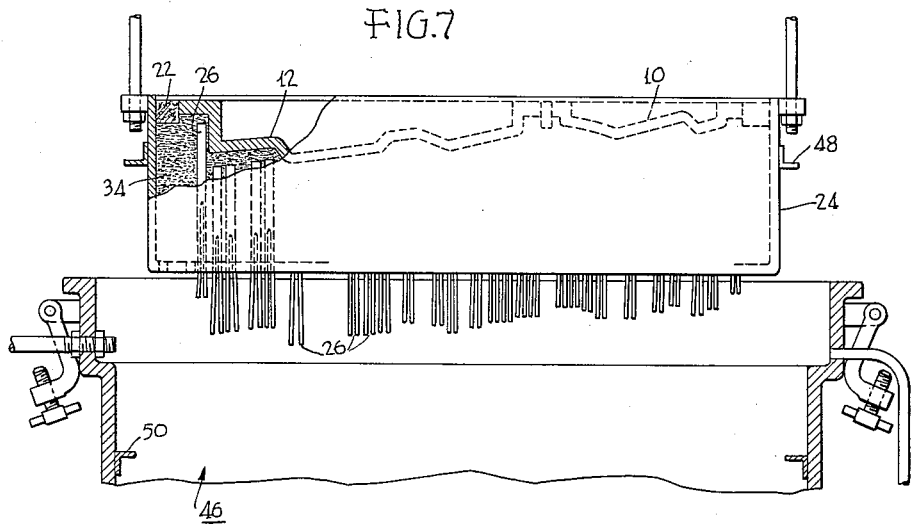
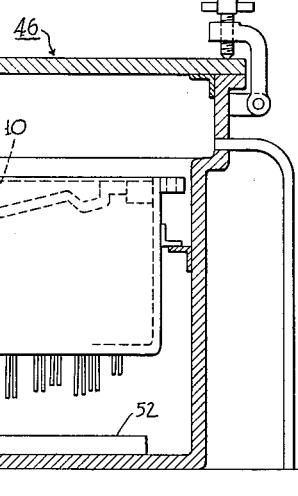
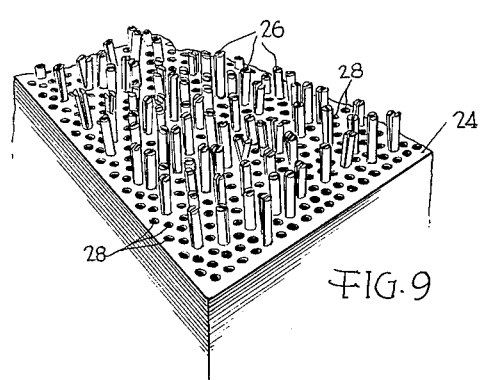
INVENTOR.
John O. Trimble
BY
John B Sowell
ATTORNEY

United States Patent Office 3,109,209
Patented Nov. 5, 1963

3,109,209
MOLD-SUPPORTING MEANS AND PROCESS
FOR MAKING SAME
John O. Trimble, Malvern, Pa., assignor, by mesne assignments, to Union Carbide Corporation, New York, N.Y., a corporation of New York
Filed Feb. 8, 1961, Ser. No. 87,894
5 Claims. (Cl. 22—74)

This invention relates generally to support means for molds which are not inherently strong enough to be self-supporting and more particularly to a thermal conductive support means for supporting metal molds subject to heat.

In the process of forming objects from molds it is sometimes desirable that the mold be heated prior to depositing material which solidifies to form a molded object. The temperature of the mold is often critical and must be held to close tolerances.

Heated molds often produce superior surface finishes of the object formed and have the added advantage of eliminating shrinkage as the heated mold expands and automatically compensates for shrinkage of the molded object.

Molds made of metals are often desirable for their temperature coefficients of expansion are more near equal the material being deposited in the mold to form an object. It is especially desirable to make molds from soft metals such as zinc, lead and tin which are easily worked to form molds or may be sprayed in molten form over master models to form a mold or pattern.

Molds made from soft sprayable materials have the undesirable characteristic that they melt at relatively low temperatures. When such materials are used to make heated molds the mold or pattern does not retain its cold structural strength and tends to distort easily resulting in imperfectly formed objects.

Heretofore there has not been any successful way of supporting heated molds made from soft materials when the mold is rather large and has an irregular surface contour. When such heated molds are supported by conventional means on racks or platforms they tend to sag and distort.

Molds which are substantially flat and of uniform thickness may be supported by conventional means, and being of uniform thickness may be heated uniformly to a desired temperature by conventional heating means. Molds of irregular shape cannot be easily supported and special apparatus is required to heat them uniformly to a desired temperature.

It would be desirable to provide a means for utilizing heated molds constructed of soft materials which would permit their use at elevated temperatures.

It would also be desirable to provide support means which would prevent distortion of the mold.

It would also be desirable to provide a support means which would supplement the structural rigidity of heated molds, and further permit uniform heating of the molds.

It would be further desirable to provide in addition to supporting structure a means for maintaining uniform controlled temperature of the molds.

Therefore, it is a general object to provide a mold support means which supports a mold with uniform pressure over the entire supported surface.

It is another object to provide a heat conductive support means which permits heating the molds uniformly.

It is a further object to provide rods in the support means of high thermal conductivity which tend to stabilize the temperature of the mold.

The means hereby provided are particularly suitable for providing thermal exchange from the mold to the atmosphere or other thermal sink while providing supporting structure.

In accordance with the invention there is provided an apparatus for supporting a mold comprising in combination a hollow cope for supporting a mold, said cope being perforated at one surface and open for receiving the mold at the opposite surface, heat conductive rods fastened in said perforations and extending into said hollow cope to the near proximity of said mold, a heat source, and heat conductive particulate material inserted into the hollow cope between said rods and said surfaces to provide uniform support for said mold, said heat conductive rods and particulate material cooperating to transfer heat from said source to said mold.

Other features and objects of the invention will be found throughout the more detailed description of the invention which follows. Those novel features believed descriptive of the nature of the invention are described with particularity in the appended claims. To more clearly portray the invention and its manner of operation the description is supplemented with the accompanying drawings.

FIG. 4 is a partial section in elevation of the cope in FIG. 3 showing the sealing of the particulate material in the hollow perforated cope.

FIG. 5 is a partial section in elevation of the mold support means of FIG. 4 showing the attachment of a turnover frame.

FIG. 6 is a partial section in elevation showing the cope support means of FIG. 5 upright in the turnover frame.

FIG. 7 is a partial section in elevation showing the mold support being lowered into a heating oven.

FIG. 8 is a partial section in elevation of the mold support means mounted in the oven.

FIG. 9 is a perspective view of part of the cope shown in FIG. 2 further showing typical placement of the conductive rods.

Figure 1:
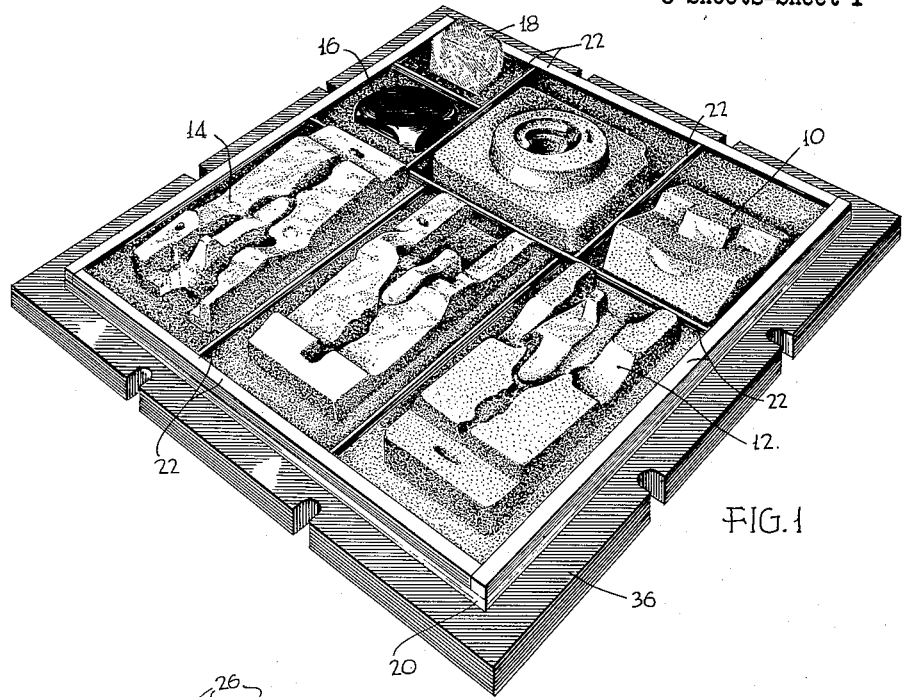
FIG. 1 is a perspective view of several molds placed face down prior to being mounted in the support means.

Referring now in more particularity to the drawings where there is illustrated in FIG. 1 several of the metal molds of the type which require support. Molds or patterns 10, 12 and 14 are made of metals having relative low melting temperatures such as zinc, tin or lead. Pattern 16 is a steel pattern made by machining and pattern 18 is metallic faced and/or made of plastic having a low melting temperature reinforced with Fiberglas. All the patterns shown are placed face down on a flat plate 20 and are separated from each other by an insulating material 22.

Figure 2:
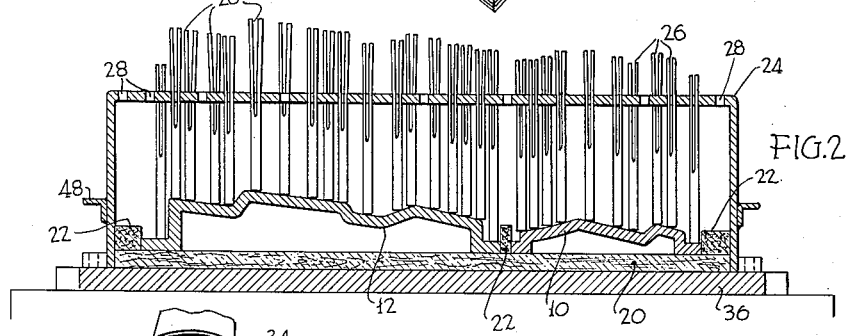
FIG. 2 is a section in elevation of the mold arrangement of FIG. 1 showing placement of the perforated cope and thermal conductive rods.

As shown in FIG. 2 a cope or flash 24 in the form of a rigid box-like structure is placed over the patterns to be supported, and conductive rods 26 are inserted in the perforations 28 until they just touch the back of the patterns to be supported. The perforated bottom surface of the cope 24 is shown in FIG. 9 where conductive rods 26 are inserted into some of the perforations. The rods 26 are split and the thongs biased apart to provide a simple means of keeping the rods at a desired adjustment. The rods 26 are placed in such a manner and number to provide equal heat conduction to all areas of the molds.

Figure 3:
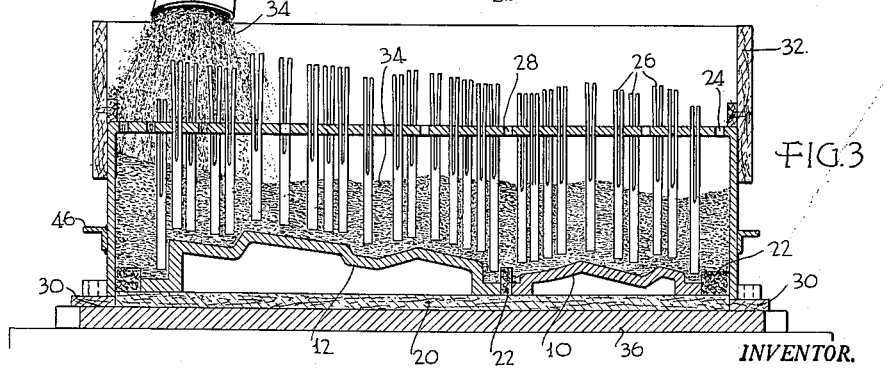
FIG. 3 is a section in elevation of the cope in FIG. 2 blocked up to provide clearance between the molds and heat conductive rods, also showing the insertion of heat conductive particulate material.

Rods 26 are preferably installed barely touching the back of the pattern as shown in FIG. 2 but may be modified to achieve more uniform temperatures. Cope 24 is then raised a predetermined amount, usually about one-half inch, and placed on a spacer 30 as shown in FIG. 3.

A guide box 32 is mounted above and around the perforated face of the cope 24, and a fine particulate material 34 is sifted, not poured, into the hollow cope covering the molds. Particulate material 34, preferably of a high heat conductive metal such as elongated aluminum fiber, may be packed by vibration to completely fill the hollow space in the cope. Heat conductive rods 26 serve to transmit heat to the near proximity of the bottom of the patterns. The particulate material 34 tends to diffuse the heat and provide uniform temperature heat transmission to the patterns while forming an oriented compact mass with substantial strength in compression.

After the particulate material 34 fills the cope, any excess covering the perforated surface is removed and the particulate material is sealed in the cope. Perforations 28 without rods may be sealed individually, or collectively by spraying a sealer 29 over the surface as shown in FIG. 4.

After the cope 24 has been sealed it is ready to be turned over and inserted in a heating oven or thermal sink. The oven 46 illustrated in FIGS. 7 and 8 is particularly adapted for use in depositing metal carbonyl gas on the molds. To facilitate handling of the cope the flat plate 20, used as a mounting surface for the patterns, is supported by a bottom surface 36 of a turnover table 38 as shown in FIG. 5. Bottom surface 36 is attached to a top surface 40 by means of bolts 42 and holds cope 24 fast to the bottom surface by spacer blocks 44. The table and cope assembly is turned over by means of journaled levers, not shown, connectable to the sides of the cope. When the assembly is turned over as shown in FIG. 6, the bottom surface 36 is removed and the cope 24 may be lifted free from the turnover table. Suitable fasteners are attached to the cope for loading the cope into the heating oven 46 shown in FIGS. 7 and 8. Brackets 48 on the cope fit against brackets 50 in the heating oven 46 to form a seal and support means. A suitable controlled heat source 52 in the bottom of the heating oven controls the heat at the bottom of the cope. The top of the heating oven is provided with a fitted top that may be screwed down to form a sealed top for the heat sink.

The novel mold support means provides not only uniform support to the irregular surface of the mold, but provides a thermal exchange layer which enables accurate temperature control. Metal molds of the type used with the novel support means are usually constructed of metals such as zinc, lead or tin. Such materials have low melting temperatures but offer the advantage that they are easily employed to construct the mold. Temperatures of the heat sink may be maintained considerably above the melting point of the mold material, but the particulate material in the cope serves as a thermal conductive barrier to reduce the temperature at the molds. The surface of the molds being of irregular shape are actually located at different distances from the heat sink and ordinarily would be heated or cooled to the temperature of the adjacent particulate material 34 whose temperature may vary since it is at different distances from the heat sink. In order to provide a means for maintaining a uniform temperature at different distances from the heat sink, thermal conductive rods 26 are placed throughout the particulate material 34 at substantially equal distances from the mold. Heat conductive rods 26 made of the same material as the particulate material have the ability to transmit heat many times in excess of the particulate material. Thus, uniform temperature is maintained in equal proximity to the mold shell by the conductive rods 26 and the temperature gradient at the bottom surface of the mold is substantially eliminated.

By placing temperature indicating devices 54 at critical points in the cope 24, rods 26, particulate material 34 and molds like 10, the mold temperature may be raised uniformly to a desired temperature and held without overheating the molds. The packed particulate material 34 may expand and pack tighter when heated, without altering its support strength or distorting the molds. This is accomplished by the selection of the shaped particulate material. Elongated or crescent shaped particulate fibers deposited in the cope by sifting or aspersing will lie flat rather than on ends. When expanding due to increase in temperature in an enclosure the fibers slip past each other in a horizontal direction while offering a firm compressed mass in the vertical direction. Expansion has been found to be entirely uniform.

Molds thus supported may be heated to the point where they retain little or no structural rigidity without incurring any distortion, for the molds are uniformly heated and uniformly supported.

Not only does the novel mold support means function to heat and support the mold uniformly, but once a material is deposited in the mold to form an object the same heat sink means may operate to cool the mold uniformly. It is apparent the apparatus may be used as a mold cooling means without being used as a heating means or visa versa. For example, molds made of metallic oxides with adhesive binders may be supported or held together by particulate material and cooled in the manner hereinbefore explained after a casting material is deposited in the molds.

The novel supporting apparatus may be provided with temperature indicating devices 54 which serve to indicate and automatically regulate the heat source 52. The control means, not shown, are known in the art and may include scanning devices to shift control from one indicator to another.

It is to be understood that the form of the invention shown is illustrative of the invention, and that modifications and substitutions may be made without departing from the scope of the invention, some of the novel features of which are defined in the appended claims.

What is claimed is:

1. In combination in a casting device for supporting molds which are not inherently strong enough to be self-supporting, at least one mold composed of a low melting temperature metal, a hollow cope having a perforated surface and an open face opposite thereto, said mold being disposed at said open face; a plurality of thermal conductive rods passing through and releasably secured to said perforated surface of said cope and being spaced from said mold, said cope being filled with a particulate thermal conductive material between said perforated surface and said mold and between the ends of said rods and said mold, said material and said rods cooperating to provide a uniform support for said mold and in acting to establish a uniform temperature at the bottom surface of said mold.

2. The combination of claim 1 wherein said particulate material is metallic and of a fibrous composition.

3. A method of supporting a mold which is not inherently strong enough to be self-supporting, comprising the steps of:
   (a) positioning a hollow cope having a perforated surface and having an open face opposite thereto over said mold which is disposed upon a mounting table,
   (b) inserting heat-conductive rods through some of said perforations and spacing the ends of said rods apart from said mold,
   (c) releasably mounting said rods to said perforated surface in such positions,
   (d) sifting particulate heat-conductive material through the remaining perforations,
   (e) vibrating said cope during said sifting thereby packing said material uniformly around said rods and between the ends thereof and said mold,
   (f) sealing said perforations by depositing a sealer over said perforated surface,
   (g) inverting said mounting table and said cope, and
   (h) removing said mounting table whereby said mold is uniformly supported by said particulate material.

4. The combination of claim 2 wherein said material is aluminum fiber.

5. The combination of claim 4 wherein said rods are also made of aluminum.

References Cited in the file of this patent

UNITED STATES PATENTS

| | | |
|---|---|---|
| 1,409,591 | Schavoir | Mar. 14, 1922 |
| 1,481,320 | Johnston | Jan. 22, 1924 |
| 1,977,731 | Masury | Oct. 23, 1934 |
| 2,420,003 | Miller | May 6, 1947 |
| 2,510,907 | Renaud | June 6, 1950 |
| 2,526,753 | Huck | Oct. 24, 1950 |
| 2,778,077 | Andrews | Jan. 22, 1957 |
| 2,940,140 | Frantz | June 14, 1960 |

FOREIGN PATENTS

| | | |
|---|---|---|
| 832,934 | Germany | Mar. 3, 1952 |

OTHER REFERENCES

"Foundry Trade Journal," vol. 95, Sept. 17, 1953, page 37.